United States Patent
Shoemaker, Jr.

(10) Patent No.: US 11,313,443 B1
(45) Date of Patent: Apr. 26, 2022

(54) PULLEY SYSTEM FOR POSITIONING AN ARCADE GAME PICK-UP DEVICE

(71) Applicant: Stephen P. Shoemaker Trust, Manhattan Beach, CA (US)

(72) Inventor: Stephen P. Shoemaker, Jr., Redondo Beach, CA (US)

(73) Assignee: Stephen P. Shoemaker Trust, Manhattan Beach, CA (US)

( * ) Notice: Subject to any disclaimer, the term of this patent is extended or adjusted under 35 U.S.C. 154(b) by 0 days.

(21) Appl. No.: 17/517,498

(22) Filed: Nov. 2, 2021

(51) Int. Cl.
G05G 11/00 (2006.01)
F16H 19/06 (2006.01)
A63F 9/30 (2006.01)

(52) U.S. Cl.
CPC ............. *F16H 19/06* (2013.01); *A63F 9/30* (2013.01); *F16H 2019/069* (2013.01); *F16H 2019/0686* (2013.01)

(58) Field of Classification Search
CPC .... A63F 9/30; F16H 19/06; F16H 2019/0686; F16H 2019/069
See application file for complete search history.

(56) References Cited

U.S. PATENT DOCUMENTS

| | | | | |
|---|---|---|---|---|
| 4,550,503 A * | 11/1985 | Klawitter | ............... | B43L 13/00 33/1 M |
| 4,778,176 A * | 10/1988 | Shoemaker, Jr. | ......... | A63F 9/30 212/225 |
| 5,967,892 A * | 10/1999 | Shoemaker, Jr. | ......... | A63F 9/24 273/448 |
| 6,139,429 A * | 10/2000 | Shoemaker, Jr. | ......... | A63F 9/24 273/448 |
| 7,857,318 B1 * | 12/2010 | Shoemaker, Jr | .......... | A63F 9/30 273/448 |
| 8,016,292 B1 * | 9/2011 | Yang | ..................... | G07F 11/165 273/451 |
| 9,539,496 B1 * | 1/2017 | Shoemaker, Jr. | ......... | A63F 9/30 |
| 2019/0076747 A1 * | 3/2019 | Zachmann | ............. | A63H 17/38 |

* cited by examiner

*Primary Examiner* — Jake Cook
(74) *Attorney, Agent, or Firm* — Fulwider Patton LLP

(57) ABSTRACT

A system for maneuvering a pick-up device such as a vacuum, claw, or other crane for an arcade game or the like comprises a metallic frame and two motors. A mount is suspended over the frame and the movement of the mount is managed by monofilament loops rotated by the motors using a set of four stacks of pulleys. The arrangement of the pulleys allows the mount and pick-up device to be easily maneuvered anywhere within the frame.

4 Claims, 5 Drawing Sheets

PULLEY SYSTEM FOR POSITIONING AN ARCADE GAME PICK-UP DEVICE

BACKGROUND

Arcade games of the type where a crane moves within a confined space and then lowers to pick up a prize is well known in the art. To manage control of the pick-up device, the most common mechanism moves one rod with the up/down motor and positioning motor in the center. This rod mechanism is moved along another rod. The system may use belts to control the movement of the rails and one or two-way motors that respond to commands from a control center to rotate the belts in the correct direction and position. This system requires larger motors and are weakened by friction, drag, weight, and vibration/bouncing. Another system manages control of the pick-up device by moving along first rail while the rail itself moves along a second rail, such as the system found in U.S. Pat. No. 9,539,496 to the present inventor, the content of which is incorporated herein by reference. This system requires that he pick-up device is controlled by the two moving rods that are driven from one end and slide on the other end. Both of these systems use belts, screws, gears, etc. to control the movement of the rails and bi-directional motors that respond to commands from a control center to move the pick-up device mechanically in the correct direction and position.

SUMMARY OF THE INVENTION

The present invention is a pulley system for moving two crossing rods that support a pick-up device in a game or machine where the position of the pick-up device is controlled by two motors mounted on or adjacent a rectangular frame. At each corner of the rectangular frame is a vertical stack of horizontally oriented pulleys held by a length of bolt having threads that permit the fixture to be hung from the top of the game's housing. The motors are connected to the pulleys using a pair of thin monofilaments, which in turn move a pair of rods oriented orthogonal to each other over the game's playing field. Each monofilament engages at least one pulley on all four corners and passes through a first block on one side of the rectangular frame and is attached to a block on the opposite side of the rectangular frame. The blocks each have an aperture that receives one end of a rod that spans the rectangular frame, such that the four blocks support the two perpendicular rods. In a first embodiment, two sides of the rectangular frame are slightly higher than the other two sides so that one of the rods sits just above or below the other rod. As the shaft of the motors rotate, the blocks attached to the monofilament slide along the sides of the frame, supported by the frame itself, such that the rod is carried with the blocks in a motion that is parallel to one set of sides of the frame. The rods are moved by being pulled from both ends in the same direction. Moving the rods by both ends reduces drag, chattering and permits smaller motors to be used. The blocks at each end of the rods are attached to the monofilament. The rods support and control the movement of a mount such as a plate onto which any pick-up mechanism can be secured. The two rod system allows movement of the mount in the forward/rearward and left/right directions to cover one hundred percent of the prize area. This is critical in some jurisdictions where the legality of the game requires this aspect hold true. The movement of the pick-up device is smooth and precise, and no lubricant is needed because of the nature of the monofilaments.

These and other features of the invention will best be understood with reference to the accompanying figures in conjunction with the detailed description of the invention below.

DETAILED DESCRIPTION OF THE PREFERRED EMBODIMENTS

Figure 1:
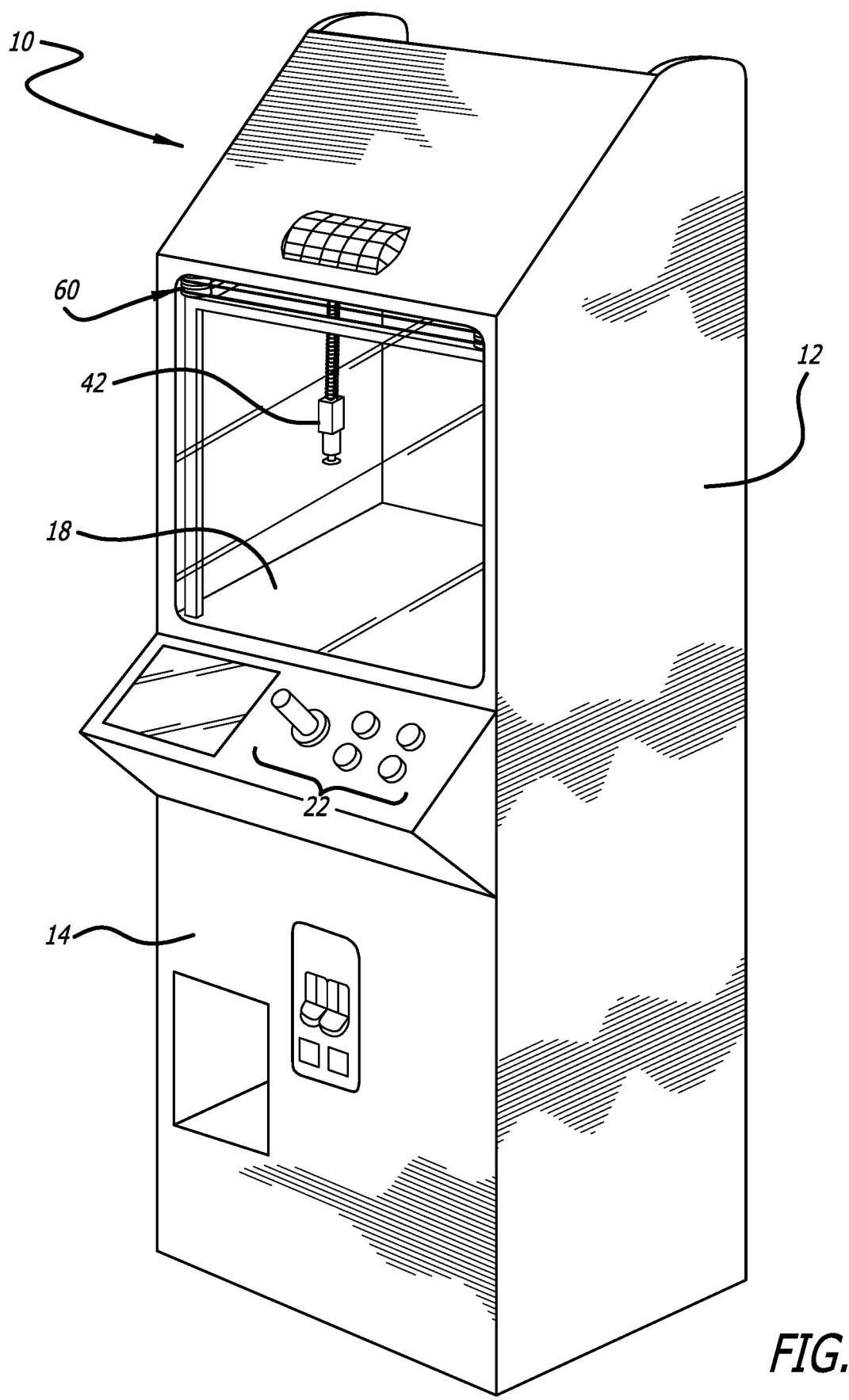
FIG. 1 is an elevated perspective view of an arcade game that can be used with the present invention.

FIG. 1 illustrates an arcade crane game 10, such as that described in U.S. patent application Ser. No. 14/838,980 entitled "Vacuum Crane Game," by the present inventor, the contents of which are fully incorporated herein by reference. The details of the various components of the game extraneous to the present invention is omitted herein for brevity.

The game apparatus 10 includes a housing 12, front panel 14, and a playing area 18. Housing 12 provides a support for the other components of the game apparatus. Housings can take a wide variety of forms; for example, as shown in FIG. 1, housing 12 may be of the stand-up variety in which a player stands in front of the game or sits on a stool when playing the game. In other embodiments, other types of housings may be provided. For example, a counter-top housing, including approximately the upper half of housing 12 shown in FIG. 1, can be used when the game apparatus 10 is desired to be placed on a table, counter top or other similar surface.

FIG. 1 illustrates a pick-up device 42 (in this case, a vacuum suction cup) hovering over the game's playing area 18. The pick-up device 42 must be capable of being moved to any location within the plane defined by the area of the targets/prizes/objections to be captured by the pick-up device. The present invention uses a monofilament pulley drive system with two motors and four columns of vertically stacked, horizontally oriented pulleys to control the movement of the pick-up device 42, where the player controls 22 are electrically connected to the motors that govern the movements of the game. The electrical wires that connect the motors to the circuit board are omitted for brevity to better emphasize the components of the invention.

Figure 2:
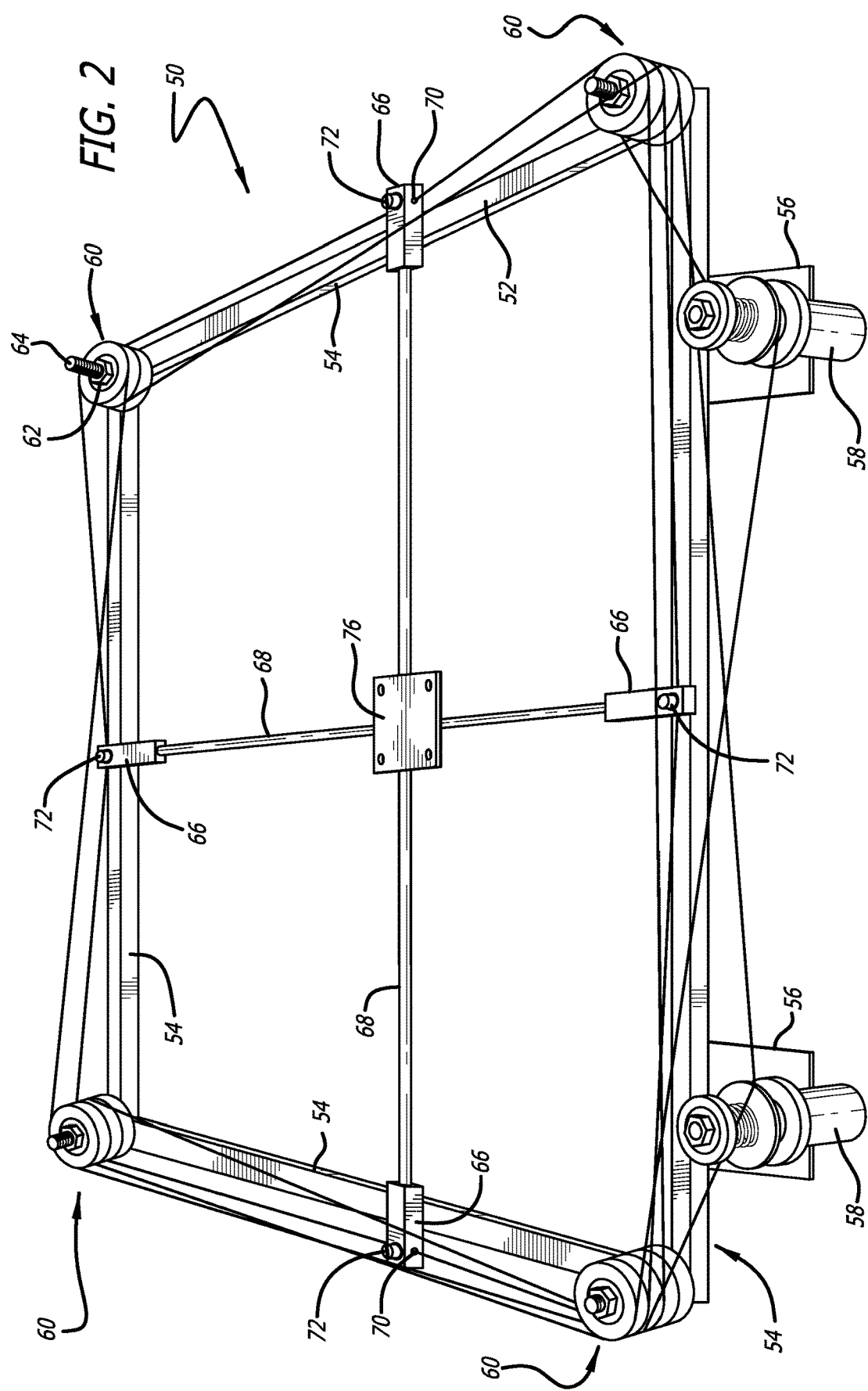
FIG. 2 is an elevated perspective view of the motor and pulley system of the present invention.

FIG. 2 illustrates a system configured for moving a centrally disposed mounting plate 76 that can be used to secure a pick-up device for movement within a horizontal plane for the purpose of picking up an object situated below. Other games could employ a device for dropping objects onto targets or other uses where part of the game requires a hovering component over the playing field. The assembly 50 has a rigid rectangular open metal frame 52 formed by four bars 54, preferably by welding or brackets. The frame 52 has front and rear bars that are slightly longer in a preferred embodiment than left and right bars to account for a game that is wider than deep, although the reverse can also be true as well as all sides being equal length. In another preferred embodiment, the front and rear bars have an upper surface that is raised above the upper surface of the left and right bars so that the associated rods have clearance between them. The metal frame 52 can include first and second outwardly and rearwardly directed platforms 56 onto each of which one electric motor 58 is mounted. The electric motors 58 are oriented with a rotating drive shaft that is normal to a horizontal plane.

On each corner of the frame 52 is a vertical stack 60 of horizontally oriented pulleys, numbering between two and four pulleys. Each pulley in a stack 60 rotates independently and can rotate in both directions while aligned on a common spindle or axel. A fastener 64 passes through each spindle with a nut 62 on top to secure the stack 60 together. In a first embodiment, the stack having two pulleys is diagonally across the stack having four pulleys, and each of the three pulley stacks are diagonal from each other. There may be other arrangements where the stacks 60 have different numbers of pulleys.

The frame's bars 54 each support a block 66 that is smooth and configured to slide easily along the upper surface of the respective bar of the frame 52. Each block 66 has a first cylindrical recess that is sized to receive one end of a rod 68 therein. The rods 68 are sized such that with each end inside the respective block's cylindrical recess, the blocks 66 are centered over one bar 54 of the frame 52. The block-rod-block assembly moves as a single unit across the frame 52, either front to back or side to side, depending upon which rod 68 is being considered. Each block 66 also includes a through hole 70 having an axis that is transverse to the axis of the cylindrical recess. The through hole 70 for each block 66 includes a clamping mechanism 72 that captures and fixes a respective monofilament therein, such that movement of the monofilament causes a corresponding movement of the associated block. Blocks 66 on opposite sides are attached to the same monofilament, and as described below the rotation of the monofilament causes each block 66 to move in the same direction.

Figure 3:
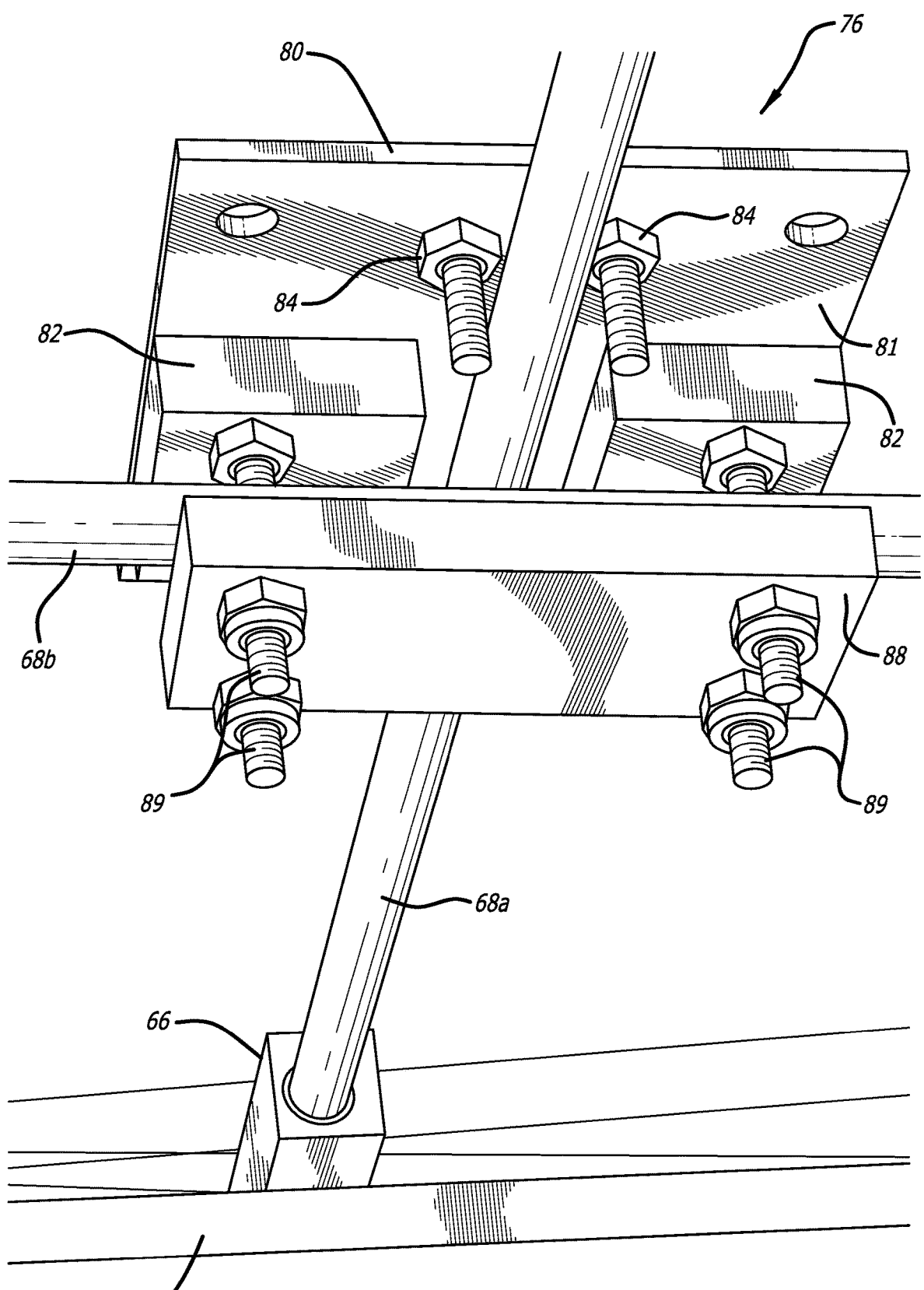
FIG. 3 is an enlarged, perspective view from below of the mount of the system.

The first and second rods 68 are attached at their intersection to a mount 76 as shown in FIG. 3. The mount 76 includes an upper plate 80 that includes a pair of metal squares 82 connected on an underside surface 81 that are spaced apart to form a first passageway between two pairs of fasteners 84 for rod 68a. Connected to the pair of metal squares 82 is an elongate metal bar 88 that cooperates with the two metal squares to form, between two sets of fasteners 89, a transverse passageway for rod 68b. With this arrangement, the mount 76 can slide on or over both rods 68a,68b. In this way, when a rod is moved to the right for example, the mount 76 moves to the right as a result of the force applied on the mount by the rod. If that same rod moves left, the mount then moves left. Similarly, if the other rod moves back, the mount 76 moves back as a result of the force applied on the mount by the rod. If that rod moves forward, the mount moves forward by the same amount. Since the rods 68a,b are slightly vertically offset, the mount 76 can move in a direction that is a product of both rods' movements in a way that can position the mount 76 in any location between the sides of the frame 52 (or at least up to the block on that side). Because each pair of blocks 66 move in unison, the translation of the mount is smooth and easily carried out by the small electric motors 58 positioned adjacent the frame 52.

The mount 76 is controlled by movement of the respective pairs of blocks 66 on the frame 52, which in turn are controlled by a monofilament connecting the pairs of blocks to the respective motor 58. The monofilaments are wound around the pulleys in a manner that maintains the same lateral direction (left-right, front back) rather than the same circular direction (clockwise, counterclockwise). That is, the monofilament is wound so that each pair of blocks 66 moves in the same direction when the motor 58 rotates the monofilament, rather than one block moving in one direction and the second block moving in a second direction.

Figure 4:
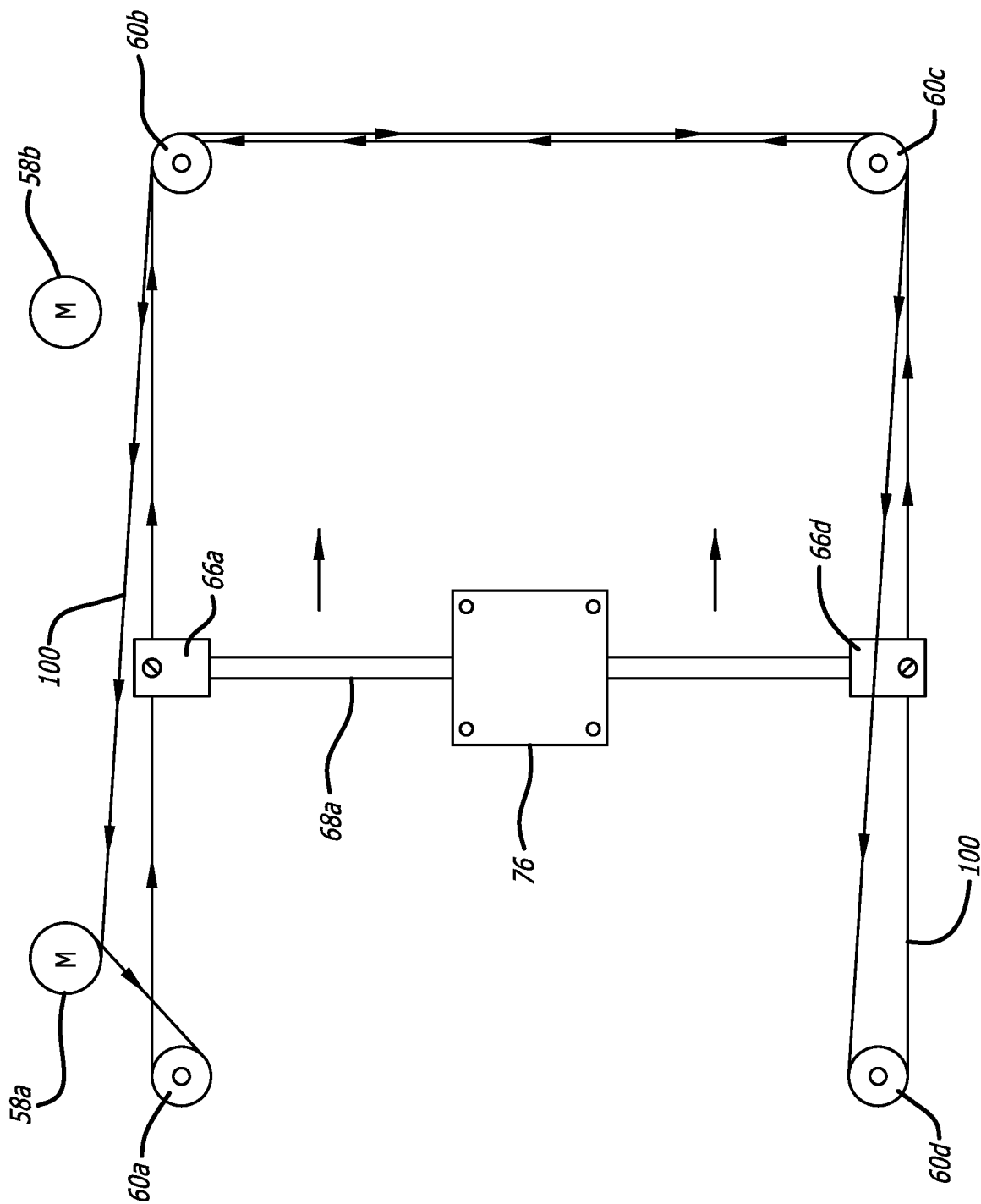
FIG. 4 is a plan view of the portion of the system that moves the mount right and left.

Turning to FIG. 4, the movement of the mount 76 in the left-right directions is illustrated. In one example, a common monofilament loop connects the motor 58a with the first stack of pulleys 60a, the next stack of pulleys 60b, the third stack of pulleys 60c, and the final stack of pulleys 60d. The two pulley stack 60d is used as a reverser where the monofilament 100 crosses over from the outer side of the exiting stack 60c to the inner side of the reversing pulley 60d and back to the originating stack 60c in the opposite direction (using a different pulley in the stack from the original pulley). This cross over changes the direction of the monofilament 100 without changing the speed of the monofilament 100, so that if one block 66a is connected before the reverser pulley 60d and the associated second block 66b of the pair is connected to the monofilament 100 after the reverser pulley 60d, the blocks 66a,b will move in the same lateral direction at the same speed. Changing the direction of the motor 58a therefore moves the mount 76 in either the left or right directions based on the movement of the blocks 66a,b and rod 68a.

Figure 5:
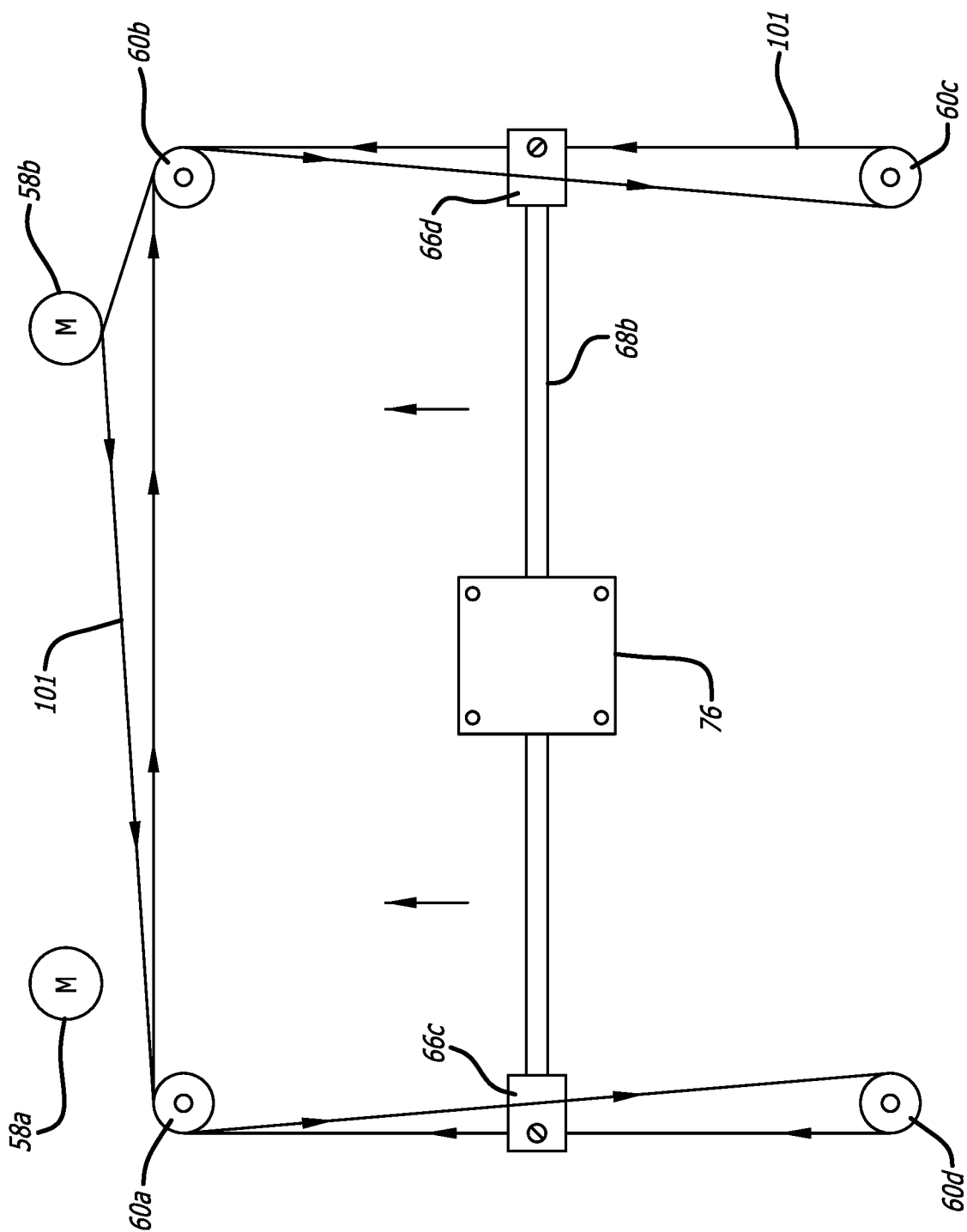
FIG. 5 is a plan view of the portion of the system that moves the mount backwards and frontwards.

Similarly, a common monofilament loop 101 as shown in FIG. 5 controls the front to back motion and connects the motor 58b with the first stack of pulleys 60a, the reverser pulley stack 60d, back to the first pulley stack 60a, to the next stack of pulleys 60b, and the final stack of pulleys 60c. The two pulley stack 60d is again used as a reverser where the monofilament 101 crosses over from the outer side of the exiting stack 60a to the inner side of the reversing pulley 60d and back to the originating stack 60a in the opposite direction (using a different pulley in the stack from the original pulley). This cross over changes the direction of the monofilament 101 without changing the speed of the monofilament 101, so that if one block 66c is connected before the reverser pulley 60d and the associated second block 66d of the pair is connected to the monofilament 101 after the reverser pulley 60d, the blocks 66a,b will move in the same lateral direction at the same speed. Changing the direction of the motor 58b therefore moves the mount 76 in either the left or right directions based on the movement of the blocks 66c,d and rod 68b.

Thus, when both motors control the blocks (and therefor the rods and mount) in this manner, the pick-up device can be moved over the playing field and within the open area of the frame 52.

The foregoing description is not intended to be limiting, but rather an example of the present invention. One of ordinary skill in the art would readily recognize that there are many alterations and substitutions to the just-described embodiments, and the present invention is intended to encompass all such substitutions and alterations. Accordingly, the scope of the present invention should be determined by the words of the appended claims using their ordinary meanings, in light of descriptions and depictions herein.

I claim:

1. A pulley system for positioning an arcade game pick-up device, comprising:
    a metal rectangular frame having two pairs of parallel sides each having an upper surface;
    first and second electric motors each having a rotating shaft;

a first monofilament loop partially wound about the rotating shaft of the first electric motor and a second monofilament loop partially wound about the rotating shaft of the second electric motor;

first and second pairs of blocks, said first pair of blocks retaining a first rod therebetween and the second pair of blocks retaining a second rod therebetween, the first pair of blocks each sliding on an upper surface of the first pair of parallel sides of the metal rectangular frame and the second pair of blocks each sliding on a respective upper surface of the second pair of parallel sides of the metal rectangular frame, each block further comprising a through hole for receiving and clamping a portion of one of the first and second monofilament loops passing therethrough;

a mount disposed at an intersection of the first and second rods and configured to move laterally in response to a movement of the first pair of blocks and to a movement of the second pair of blocks;

first, second, third and fourth stacks of pulleys each positioned on a respective corner of the metal rectangular frame and each pulley engaging one of the first and second monofilament loops;

wherein the monofilament loops and pulleys are arranged so that the first pair of blocks move in a first lateral direction when the first electric motor rotates the first monofilament loop and the second pair of blocks move in a second lateral direction when the second electric motor rotates the second monofilament loop, the first lateral direction and the second lateral direction being orthogonal to one another; and wherein the mount is maneuverable anywhere within the metal rectangular frame by actuating the first and second electric motors to control the position of the intersection of the first and second rods.

2. The pulley system of claim 1, wherein each block includes a fastener disposed perpendicular to the through hole for fixing the portion of the monofilament loop therein.

3. The pulley system of claim 1, wherein a pick-up device is suspended from the mount.

4. The pulley system of claim 1, wherein one of the stacks of pulleys comprises a first reversing pulley to reverse the direction of the first monofilament loop and second reversing pulley to reverse the direction of the second monofilament loop.

* * * * *